United States Patent
Kirst

[15] 3,649,100
[45] Mar. 14, 1972

[54] SLIDE PROJECTOR POLARIZING SLIDE UNIT

[72] Inventor: Paul W. Kirst, 6010 S. W. 95th Ct., Miami, Fla. 33143

[22] Filed: Mar. 11, 1970

[21] Appl. No.: 18,572

[52] U.S. Cl. ..............................350/147, 40/159, 350/95, 350/157, 353/20
[51] Int. Cl. ......................................................G02b 27/28
[58] Field of Search ..................350/95, 147, 157; 353/8, 20, 353/120; 40/158 B, 159

[56] References Cited

UNITED STATES PATENTS

| | | | |
|---|---|---|---|
| 1,989,691 | 2/1935 | Hirt | 350/95 X |
| 3,401,592 | 9/1968 | Altman | 353/20 X |
| 2,934,993 | 5/1960 | Chromy | 350/147 X |
| 3,521,964 | 7/1970 | Wilks, Jr. | 350/95 UX |
| 3,191,493 | 6/1965 | Mainardi et al. | 353/8 |

*Primary Examiner*—David Schonberg
*Assistant Examiner*—Paul R. Miller
*Attorney*—Elliott Stern

[57] ABSTRACT

A polarizing slide unit of conventional 35 mm. photographic slide proportions or other standard slide proportions adapted to be handled or projected by a conventional diascope or slide projector. The polarizing slide unit includes a polarizing light mount assembly of hollow construction having slot or pocket means adapted to removably receive a rock thin section or the like and which may be of standard or conventional microscope slide proportions. The polarizing mount assembly removably supports a rock section slide specimen in sandwich fashion between two polarizing filter panes positioned relative to one another with mutually crossed polarizing axes. The slide unit combination of the rock specimen thin section and the polarizing mount assembly is adapted to be positioned in the light system of a conventional slide projector and to project a polarized light image of the thin section specimen on a projection screen surface.

10 Claims, 4 Drawing Figures

Patented March 14, 1972

3,649,100

INVENTOR.
PAUL W. KIRST
BY John Cyril Malloy
ATTORNEY.

SLIDE PROJECTOR POLARIZING SLIDE UNIT

BACKGROUND OF THE INVENTION

1. Field of the Invention

Relates to optical petrography or crystallography and particularly relates to the optical examination of nonopaque anistropic mineral compositions in thin section mineral specimens.

2. Description of the Prior Art

The science of petrography is largely based on the examination of rock specimens in thin section and principally through the use of a microscope instrument with polarizing means or through use of a special slide projector having polarizing means and operative for projecting the rock specimen image upon a projector screen surface. The instant invention is directed mainly toward improvements in slide projection means of rock specimen examination.

The prior art thin section projector has certain advantages over the microscope viewing of thin section rock specimen slides. The projection of a rock specimen image upon a projection screen surface is particularly advantageous in classroom instruction or the like and where a group of persons may simultaneously view the specimen image on the projector screen. The prior art thin section projector is of special design having polarizing and analyzing light filter means for the examination and identification of the various rock or mineral structures. A principal disadvantage with the prior art thin section projector is the relatively high cost of the instrument. The typical high school earth science department or the small college geology department often may not be able to afford to purchase the expensive thin section projector. Also, many of the prior art thin section projectors will not project a specimen image with as much magnification and light intensity as is often desired in classroom or group instruction technique. This is particularly noticeable in classroom viewing wherein the room may not be darkened sufficiently for maximum image contrast on the projection screen.

SUMMARY OF THE INVENTION

The instant invention provides a slide or polarizing light unit, preferably of standard 35 mm. size adapted to be substituted for the typical 35 mm. photographic slide transparency in a utility or domestic type diascope or slide projector. The polarizing slide unit of the instant invention includes a thin section rock specimen or the like removably received interposedly between a pair of polarizing pane members having crossed polarizing axes. The polarizing slide unit is adapted to be inserted in the typical domestic type slide projector and is operative for projecting an image with as much or more magnification and light intensity as the specially designed thin section projector. Since the typical domestic type slide projector is considerably less expensive than the scientific specially designed thin section projector, and is generally available for other purposes, the polarizing slide unit of the invention provides relatively inexpensive means for obtaining suitable image projection of a rock specimen section or the like. The polarizing slide unit of the instant invention when used in conjunction with a domestic type slide projector, provides inexpensive means for examining the optical properties of anistropic minerals and the inspection and observation of crystal form, habit, texture, twinning, interference color and other nonopaque mineral characteristics.

DESCRIPTION OF THE PREFERRED EMBODIMENT

Figure 1:
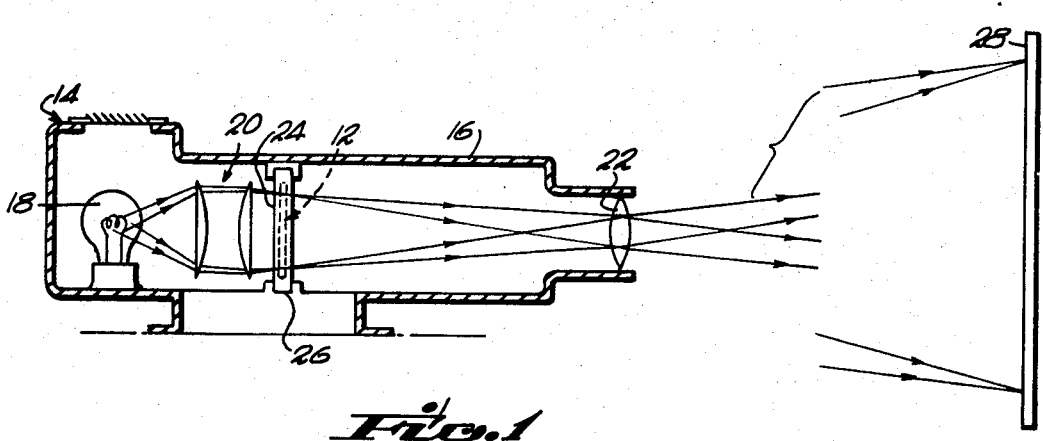
FIG. 1 is a side elevation view of a polarizing slide unit of the instant invention shown as in an operative disposition in a typical domestic type diascope or slide projector (schematically shown)
Figure 2:
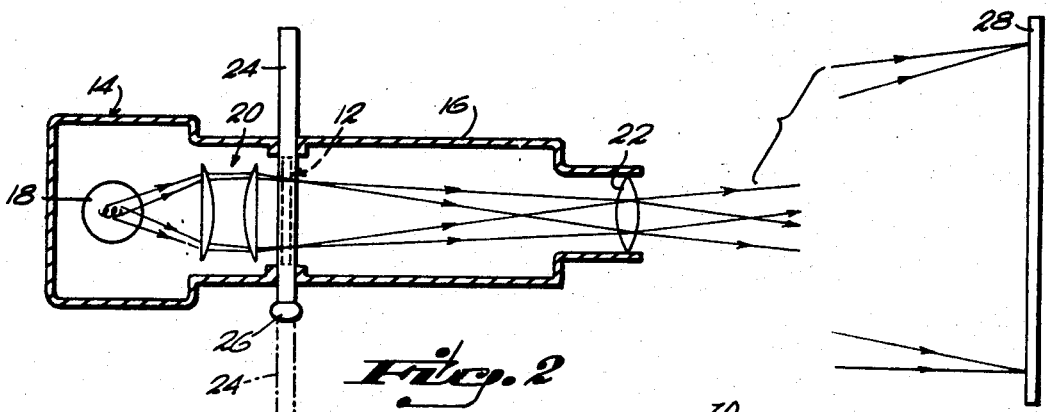
FIG. 2 is a top view of the polarizing slide unit and slide projector combination of FIG. 1.

The polarizing slide unit of the instant invention is generally indicated by reference character 12 and is shown and described in conjunction with a conventional diascope or slide projector 14 conventionally operative for projecting the images of framed photographic transparencies or photographic slides of standard 35 mm. size or other standard size. The diascope typically includes housing structure 16 enclosing light source means in the form of an incandescent light bulb 18; a condenser lens system 20; a projection lens 22; and slide transparency support means typically including a slide carriage 24 manually shiftable in the housing 16 and having means for removably receiving a selected 35 mm. slide transparency. The slide carriage 24 includes hand grip means 26 for manually actuating the slide carriage between a pushed-in position for projecting the image of a slide transparency, and a pulled-out position for permitting changing of a slide transparency (see respectively the full line and broken line showing of the slide carriage 24 in FIG. 2). A projection screen 28 typically is provided for viewing the image projected from the diascope instrument 14.

Figure 3:
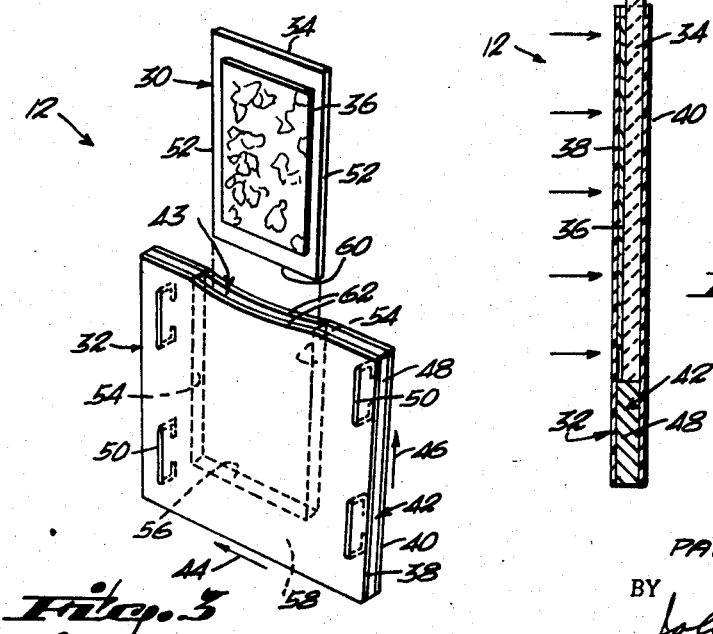
FIG. 3 is an enlarged perspective view of the polarizing slide unit of the invention and shown with the thin section specimen slide upwardly disposed relative to the polarizing mount assembly.

Referring now to FIG. 3, the polarizing slide unit 12 is of a standard photographic slide transparency size, as for example 35 mm. slide transparency size, and is adapted to be supported in the slide carriage 24 of projector 14 in lieu of a typical photographic slide transparency (not shown). The polarizing slide unit 12 of the instant invention basically includes specimen slide means 30 removably received in a hollow polarizing mount assembly 32 of standard photographic slide transparency proportion, as for example a 35 mm. slide proportion. The specimen slide means 30 also may be of typical microscope slide configuration (as shown in the drawing) and includes a transparent object plate 34 laminatingly supporting a thin section specimen 36 in a central zone thereof. By way of exemplification, the specimen slide means 30 will be considered as being of the type utilized in optical mineralogy or petrography and thus the thin section specimen 36 is of nonopaque mineral or rock composition. The thin section specimen 36 is laminatingly bonded on one face surface of the transparent object plate 34 by suitable adhesive or cement means (not shown).

Figure 4:
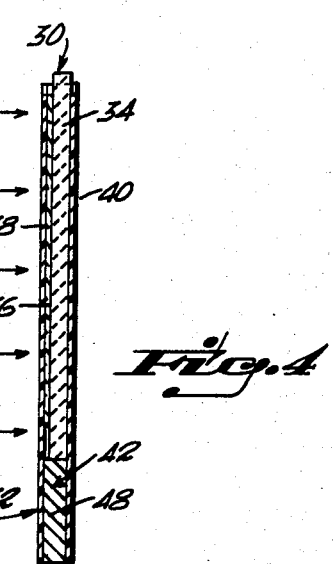
FIG. 4 is a vertical enlarged section of the polarizing slide unit of FIG. 3 illustrating the thin section specimen nested with the polarizing mount assembly.

The polarizing mount assembly 32 constitutes the essential part of the invention and preferably includes a first polarizing pane 38, a second polarizing pane 40, and spacer frame means or support structure 42 supporting the first and second panes 38, 40 in closely spaced parallel arrangement and defining a slot pocket or opening 43 for removably receiving the polarizing slide unit 12 (see FIGS. 3 and 4). The first and second polarizing panes 38, 40 each are preferably of artificially prepared polarizing film material and are supported in parallel relation by spacer frame means 42 with the light polarizing axes of the panes being mutually perpendicular. The arrows 44, 46 in FIG. 3 indicate respectively the light polarization axes of the first and second polarizing panes 38, 40.

The polarizing slide unit 12 is adapted to be supported in the diascope instrument 14 with the first polarizing pane 38 being oriented toward the light source and condenser lens 18, 20; the thin section specimen 36 is adapted to be illuminated by transmitted light passing through the specimen slide means (see FIG. 4 and light rays indicated by arrows). The first polarizing pane 38 defines the polarizer and second pane 40 the analyzer in the optical examination of the specimen slide means 30 and the polarized light image projection of the thin section specimen 36.

The support structure 42 of the polarizing mount assembly 32 preferably is in the form of a flattened U-shaped frame member 48 preferably formed of opaque, heat-resistant sheet or plate plastic stock material. The first and second polarizing panes 38, 40 and the U-shaped frame member 48 preferably are laminatingly secured together by fastener members 50 arranged along opposite side edges of the polarizing mount assembly 32. The polarizing mount assembly 32 is adapted to removably receive the specimen slide 30 in the slot opening 43 thereof with the parallel extending opposite exterior edge margins 52, 52 of the slide extending contiguous to respective interior edge margins 54, 54 of the mount assembly frame member 48 (see FIG. 3).

The upwardly oriented edge margin 56 of the horizontal bight portion 58 of frame member 48 defines stop means for the specimen slide element 30 when it is received in slot opening 43 of the polarizing mount assembly 32. The lower edge margin 60 of the specimen slide element 30 abuttingly engages the edge margin 56 of frame member 48 and positions the thin section rock specimen 36 at a disposition fully between the parallel arranged polarizing panes 38, 40. The upper edge margins respectively of the first and second polarizing panes 38, 40 preferably are scalloped or cut crescent shape as indicated at 62 for permitting ready removal or insertion of a specimen slide element 30 respectively out of or into the slot opening 43 of the polarizing mount assembly 32.

The rectangular peripheries of the first and second polarizing panes 38, 40 and the periphery of frame member 48 preferably are coextensive in rectangular size corresponding with the rectangular size of a typical standard photographic slide transparency; the thickness of the polarizing mount assembly 32 also corresponds substantially with the thickness of a conventional photographic slide transparency (not shown). The polarizing mount assembly 32 and thus the outer surface configuration of a polarizing slide unit 12 is sized to correspond with a particular size photographic slide and to be operative in a particular diascope or slide projector 14 designed for showing or handling a standard size photographic slide.

In the use of the polarizing slide unit 12, a selected specimen slide 30 is inserted in the slot opening 43 of the polarizing mount assembly 32 with the thin section specimen 36 received between the polarizer and analyzer panes 38, 40. With the slide carriage 24 of the diascope instrument 14 in an outwardly retracted disposition (shown in broken lines in FIG. 2) the slide unit 12 is vertically fitted in the slide carriage 24 and the slide carriage moved inwardly (full line showing of the carriage in FIG. 2). The polarizing slide unit 12 is positioned in front of the condenser lens system 20 and the light passing through the condenser lens illuminates the specimen slide section 36 and projects the image of the specimen on the surface of the projection screen 28. The cross polarizing panes 38, 40, in the optical examination of a selected anistropic thin section specimen, projects a polarized light image of the specimen upon projection screen 28 and the optical properties of crystallization, habit, interference color, texture, twinning and other optical properties of the specimen may be ascertained by comparison, estimation or measurement procedure. The first polarizing pane 38, called the polarizer, produces plane polarized light which then enters the material to be examined (i.e., minerals of the rock). The material, if it has optical rotary power, will permit components of this plane polarized light to enter and pass through only while vibrating in one of two directions within the material. The light which passes out through the other side of the material is vibrating in two directions (two rays vibrating at 90°). The rays traveling in these two different vibration directions travel at different speeds through the material. Thus when they emerge and pass through the second polarizing pane (the analyzer 40) they are resolved back into one direction of vibration; but since they are out of phase, it produces interference colors.

Although the instant invention is described primarily as being useful in the field of optical petrography and the examination of thin rock section specimens, it will be understood that the polarizing slide unit 12 is useful for other purposes. It can be used for viewing the interference colors of any material which possesses optical rotary power, in thin section or mounted in any other way. For rock specimens it serves to determine crystal forms, if present; mineral cleavages or fractures, and their degree of development and mutual angular relations; shape of crystals; inclusions, intergrowths and alterations, if present; and twinning, if present. The invention is also useful to distinguish between similar materials with different crystal structures, such as sugars, based on their different birefringence, or for determining whether a material is optically active.

My invention is designed also for viewing a biological wet mount between microscope slide and cover glass. Here the interference colors can be used to determine the birefringence of that substance. If polluted water, for example, contains optically active biological material, the concentration of this pollutant would produce a measurable quanta of light (interference colors) which could be measured with a photocell.

In testing sugar solutions, biological compositions or other liquid solutions by the medium of polarized light, the specimen slide means 30 will be of somewhat different form. The preparation of a microscope slide for examination of a sugar solution or biological material is well known to those in the art. The specimen slide means may be of so-called wet mount form and include an object plate and a cover plate supporting a liquid or biological specimen therebetween. It will be understood that a slide means 30 designed for examination of liquid or biological specimens may readily be inserted in the slot opening 43 of the polarizing mount assembly 32 and supported in the diascope instrument 14 for projecting a polarized light image of the specimen.

All of these features would be enlarged by the lenses in a standard slide projector, the degree of enlargement depending upon the projection distance, and projected as a large picture suitable for viewing by a large group of people.

Although the instant invention is described in what is presently conceived to be the preferred embodiment thereof, it is understood that certain changes and modifications may be made without departing from the spirit and scope of the invention.

What is claimed is:

1. A polarizing slide unit for use in a diascope type slide projector for use in optical petrography in the study of crystalline nonopaque compositions, the polarizing slide unit comprising,
   A. specimen slide means including a thin flat specimen;
   B. a polarizing mount assembly removably mounting said specimen slide means and including
      1. a first polarizing pane,
      2. a second polarizing pane, and
      3. support structure firmly maintaining said first and second panes in closely spaced parallel arrangement,
      4. said mount assembly defining a slot opening between said polarizing panes for removably receiving said specimen slide means therebetween,
      5. said first and second panes having their respective polarizing axes arranged in perpendicular relation with respect to each other;
   C. said polarizing slide unit being adapted to be removably positioned in the diascope instrument for projecting a polarized light image of the thin section specimen or the like upon a projection screen surface.

2. The unit as set forth in claim 1 wherein the specimen comprises a nonopaque rock section.

3. The unit as set forth in claim 1 wherein the specimen slide means comprises an object plate of planar form adapted for receipt in the slot opening of said mount assembly.

4. The unit as set forth in claim 3 wherein adhesive means is provided to secure the rock section specimen to said object plate.

5. The unit as set forth in claim 4 wherein the support structure comprises spacer frame means between the polarizing panes.

6. The unit as set forth in claim 1 wherein the frame means includes stop means in opposition to said slot opening to limit penetration of the slide means and to position the slide means within said mount assembly.

7. A polarizing slide unit as set forth in claim 1 wherein said specimen slide means is of generally rectangular configuration and having opposite exterior edge margins, and wherein said support structure of said polarizing mount assembly is arranged interposedly between the first and second polarizing panes and defines generally parallel confronting interior edge margins lying contiguous the opposite exterior edge margins of said specimen slide means when the same is received in said slot opening.

8. For use with a conventional diascope type projector adapted for handling framed photographic slide transparencies of standard proportions, and with a conventional microscope type slide mounting a thin section anistropic rock specimen of standard proportion, the combination of a light polarizing mount assembly adapted to detachably mount said microscope type slide for projection of the thin section image by the diascope instrument, said light polarizing mount assembly comprising, A. a first polarizing pane,
B. a second polarizing pane, and
C. support structure firmly maintaining said first and second polarizing panes in closely spaced parallel arrangement and defining a slot opening between the panes for removably receiving a microscope type slide,
D. said first and second panes being supported with the polarizing axes thereof in generally perpendicular relation;
E. said light polarizing mount assembly being adapted to receive a microscope type slide nested therein and to be removably positioned in the diascope instrument for projecting a polarized light image of the anistropic rock section specimen or the like upon a projection screen surface.

9. The mount assembly as set forth in claim 8 wherein said support structure comprises frame means defining a slot pocket between the polarizing panes adapted to nest a microscope type slide.

10. The mount assembly as set forth in claim 9 which includes stop means to position a microscope slide between the polarizing panes of said mount assembly.

* * * * *